United States Patent
Chen et al.

(10) Patent No.: US 8,324,766 B2
(45) Date of Patent: Dec. 4, 2012

(54) HEAT-DISSIPATION STRUCTURE FOR MOTOR

(75) Inventors: Hung-Chi Chen, Taoyuan Hsien (TW); Ying-Chi Chen, Taoyuan Hsien (TW); Te-Tsai Chuang, Taoyuan Hsien (TW); Kuo-Cheng Lin, Taoyuan Hsien (TW); Wen-Shi Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 12/728,799

(22) Filed: Mar. 22, 2010

(65) Prior Publication Data

US 2010/0178181 A1   Jul. 15, 2010

Related U.S. Application Data

(63) Continuation-in-part of application No. 11/058,230, filed on Feb. 16, 2005, now abandoned.

(30) Foreign Application Priority Data

Sep. 6, 2004 (TW) ................. 93126850 A

(51) Int. Cl.
   *H02K 9/00* (2006.01)
   *H02K 9/06* (2006.01)
   *F04D 29/26* (2006.01)

(52) U.S. Cl. ...... 310/62; 310/58; 417/423.8; 417/423.9; 415/206

(58) Field of Classification Search ............... 417/423.7, 417/423.8, 423.9, 423.14, 366, 368; 310/52, 310/58, 60 R, 59, 61–63, 60 A, 67 R; 415/206
   See application file for complete search history.

(56) References Cited

U.S. PATENT DOCUMENTS

| | | | | |
|---|---|---|---|---|
| 4,955,791 | A | * | 9/1990 | Wrobel ........................ 417/354 |
| 5,188,508 | A | * | 2/1993 | Scott et al. .................... 415/206 |
| 5,236,306 | A | * | 8/1993 | Hozak ......................... 416/93 R |
| 5,944,497 | A | * | 8/1999 | Kershaw et al. ............ 417/423.8 |
| 5,967,764 | A | * | 10/1999 | Booth et al. ................ 417/423.8 |
| 6,384,494 | B1 | * | 5/2002 | Avidano et al. ................. 310/58 |
| 6,773,239 | B2 | | 8/2004 | Huang et al. |
| 7,078,834 | B2 | | 7/2006 | Liu |

* cited by examiner

*Primary Examiner* — Peter J Bertheaud
(74) *Attorney, Agent, or Firm* — Birch, Stewart, Kolasch & Birch, LLP

(57) ABSTRACT

A heat-dissipation structure for a motor. The heat-dissipation structure comprises a shaft, a seat and a rotator. The rotator coupled to the seat by the shaft comprises a housing and a cover. The housing comprises an inner side connected to the shaft and a bottom comprising at least one through hole. The cover is connected to an exterior of the bottom of the housing and a distance is formed between the cover and the housing, so that the cover prevents objects from entering the through hole.

14 Claims, 5 Drawing Sheets

US 8,324,766 B2

HEAT-DISSIPATION STRUCTURE FOR MOTOR

CROSS REFERENCE TO RELATED APPLICATIONS

This application is a Continuation-In-Part of Application No. 11/058,230 filed on Feb. 16, 2005 now abandoned, which claims priority to Application No. 093126850 filed in Taiwan, on Sep. 6, 2004. The entire contents of all of the above applications is hereby incorporated by reference.

BACKGROUND

The invention relates to a heat-dissipation structure for a motor, and in particular to a heat-dissipation structure for a fan motor.

A motor is an active driving device for actuating an impeller to produce airflow to dissipate heat. Centrifugal and axial-flow fan motors are two major types of motors.

In FIG. 1A, a conventional centrifugal fan motor 1 comprises a rotator 10, an impeller 11 and a motor (not shown). The impeller 11 is installed on the rotator 10 driven by the motor. As the rotator 10 is actuated, the impeller 11 thereon is synchronically rotated to produce airflow for heat dissipation. In FIG. 1B, a conventional axial-flow fan motor 2 comprises a rotator 20, an impeller 21, a frame 22 and a motor (not shown). The impeller 21 is installed on the rotator 20 driven by the motor, and the rotator 20 and the impeller 21 are enclosed by the frame 22. As the rotator 20 is actuated, the impeller 21 thereon is synchronically rotated to produce airflow for heat dissipation, and airflow therein can be efficiently collected by the frame 22.

Heat generated by the interior of the rotator 10 or 20 over a long period of operation, however, cannot be dissipated to an exterior. Thus, the motor is easily overheated and the life thereof is reduced.

To solve this problem, two centrifugal fan motors 3 and 4 shown in FIGS. 2A and 2B are provided by forming a plurality of through holes on a rotator thereof.

In FIG. 2A, the fan motor 3 comprises a rotator 30 formed with a plurality of through holes 300, an impeller 31 and a motor (not shown). The impeller 31 is installed on the rotator 30 and driven by the motor. As the rotator 30 is actuated, the impeller 31 thereon is synchronically rotated to produce airflow for heat dissipation. Heat generated from the rotator 30 can be efficiently dissipated to the exterior via the through holes 300.

In FIG. 2B, the fan motor 4 comprises a rotator 40 formed with a plurality of through holes 400, an impeller 41, a frame 42 and a motor (not shown). Heat generated from the rotator 40 can also be efficiently dissipated to the exterior via the through holes 400 as the rotator 40 is actuated.

Dust or particles cannot be completely stopped from entering the fan motors 3 and 4 via the through holes 300 and 400, however, thus a shaft of the fan motors 3 and 4 tend to be obstructed by dust or particle accumulation reducing average life thereof.

SUMMARY

The invention provides a heat-dissipation structure for a motor to dissipate heat to the exterior and prevent particles from entering therein.

The heat-dissipation structure comprises a seat and a rotator. The rotator coupled to the seat by a shaft comprises a cylindrical housing and a cover. The housing has an inner side connected to the shaft and a bottom comprising at least one through hole. The cover covers the housing and positioned apart from the housing by a distance. Thus, the cover prevents objects such as dust or particles from entering via the through hole as the rotator is rotated, and the generated heat is efficiently dissipated to the exterior.

The cover of the invention is connected to the exterior of the bottom of the housing via a plurality of radially arranged connecting members, and at least one through hole is formed between any two adjacent connecting members. The cover is connected to the exterior of the bottom of the housing via a bar, and the housing is integrally formed with the cover and the connecting members as a single piece.

In an embodiment, the housing of the heat-dissipation structure comprises a shell and a hub connected to the shell. An inner side of the shell is connected to the shaft, and at least one through hole is formed on a bottom of the shell, and the hub is connected to the cover via the connecting members, and a distance is formed between the cover and the hub.

The heat-dissipation structure is employed on a fan structure, and the heat-dissipation structure further comprises an impeller surrounding the rotator. Thus, the impeller is rotated together with the rotator. The fan structure is a centrifugal fan or an axial-flow fan structure.

BRIEF DESCRIPTION OF THE DRAWINGS

The invention can be more fully understood by reading the subsequent detailed description and examples with references made to the accompanying drawings, wherein:

FIG. 3C' is a simplified sectional view of the rotator of the centrifugal fan motor of the invention in FIG. 3C.

DETAILED DESCRIPTION

Figure 1A:
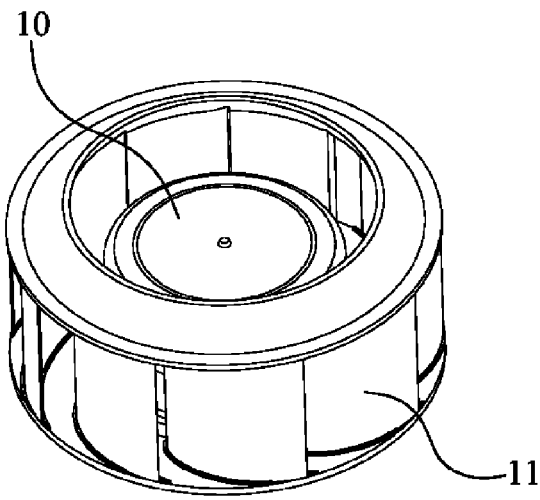
FIG. 1A is a perspective view of a conventional centrifugal fan motor.
Figure 1B:
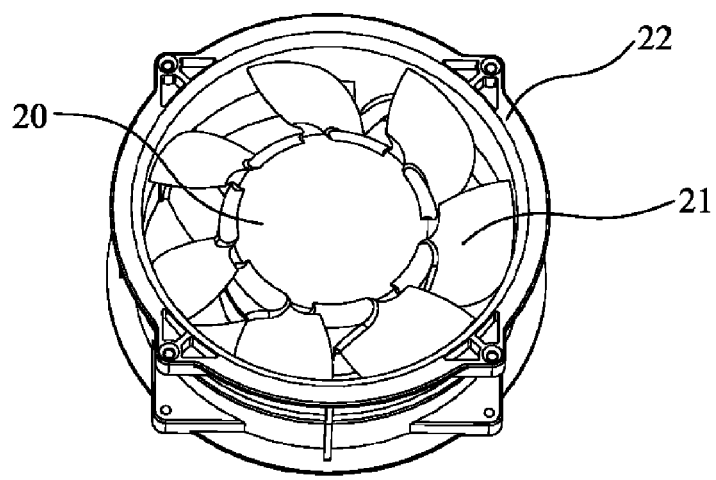
FIG. 1B is another perspective view of a conventional centrifugal fan motor.
Figure 2A:
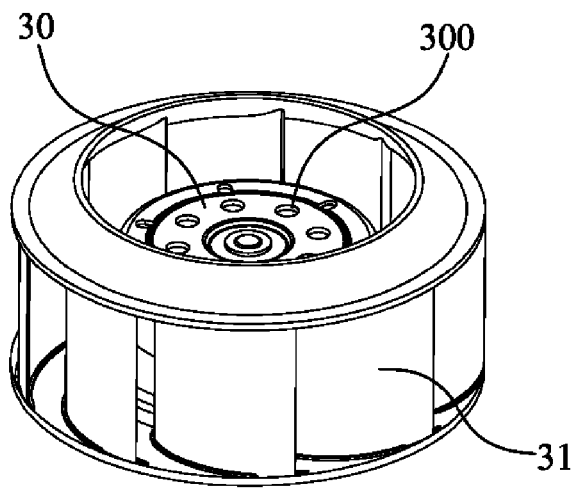
FIG. 2A is another perspective view of a conventional centrifugal fan motor.
Figure 2B:
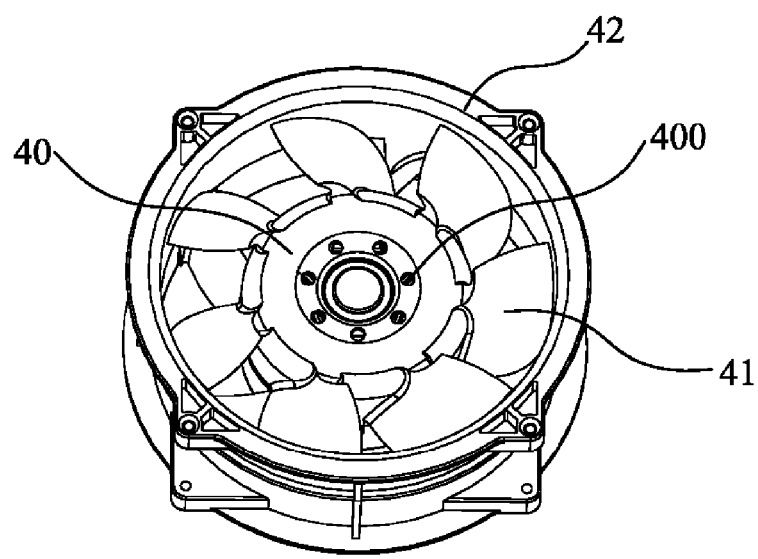
FIG. 2B is another perspective view of a conventional centrifugal fan motor.
Figure 3A:
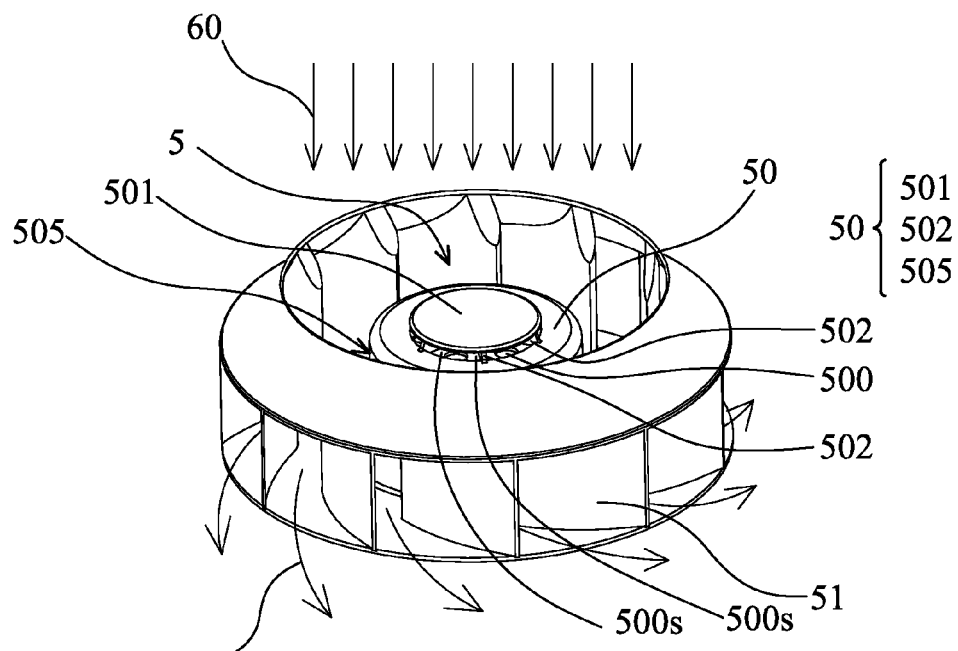
FIG. 3A is a perspective view of a centrifugal fan motor according to the invention.
Figure 3B:
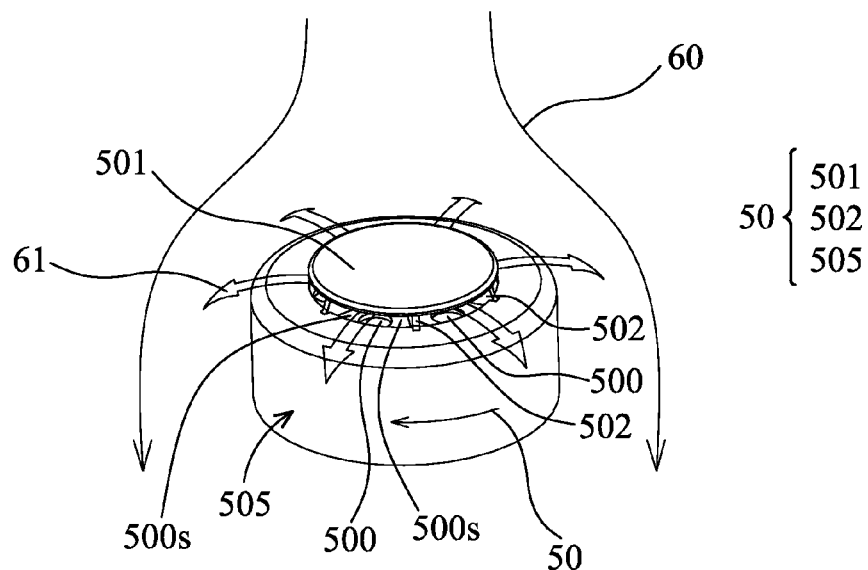
FIG. 3B is a perspective view of a rotator of the centrifugal fan motor of the invention.
Figure 3C:
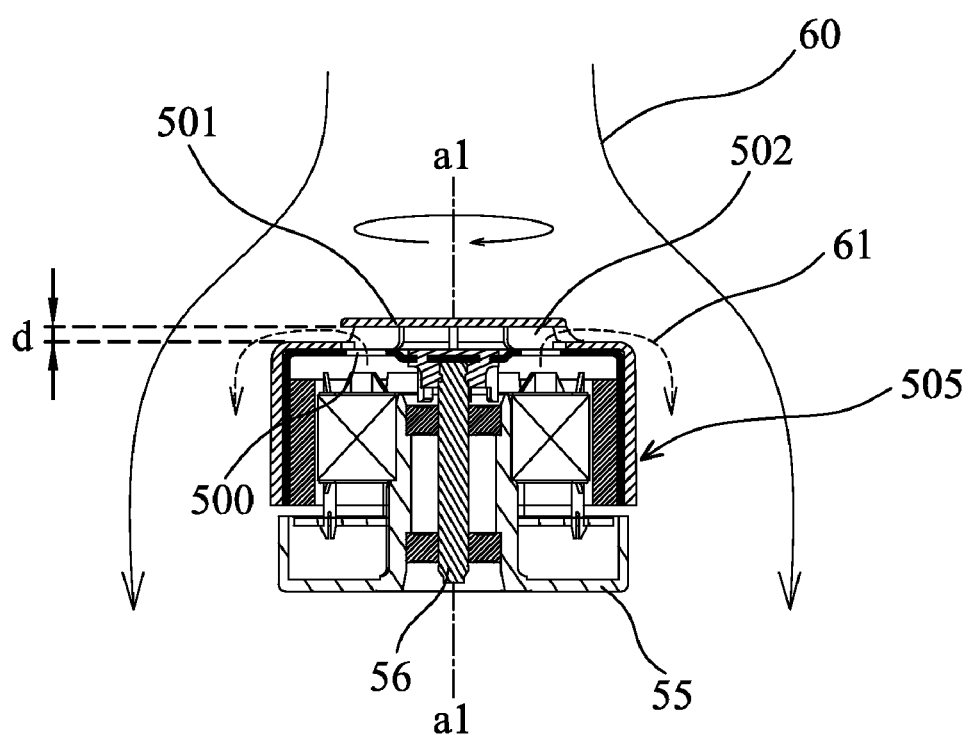
FIG. 3C is a sectional view of the rotator of the centrifugal fan motor of the invention.
Figure 3C:
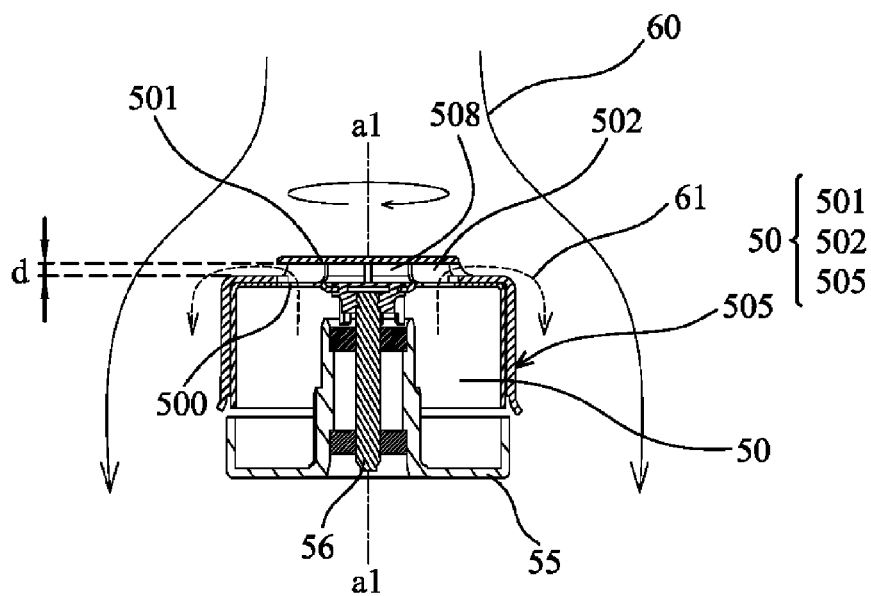

FIGS. 3A and 3B are two perspective views of a centrifugal fan motor 5 of an embodiment of the invention, FIG. 3C is a sectional view of the centrifugal fan motor 5, and FIG. 3C' is a simplified sectional view of the centrifugal fan motor 5 in FIG. 3C. It is noted that the major components such as windings, coils and magnets of the centrifugal fan motor 5 are omitted in FIG. 3C to clearly clarify the structure of the centrifugal fan motor 5.

In FIG. 3A, the centrifugal fan motor 5 comprises a rotator 50, an impeller 51 and a seat 55. In FIG. 3C', the rotator 50 is coupled to the seat 55 by a shaft 56 rotating about an axis a1-a1, and the impeller 51 surrounds the rotator 50. Thus, the impeller 51 rotates with the rotator 50, forming an active airflow to dissipate heat generated from a heat source (not shown). The rotator 50 comprises a cover 501, a plurality of uniformly-arranged connecting members 502 and a housing

505. In this embodiment, the housing 505 is rounded and cylindrical. It is to be understood that the invention is not limited thereto the disclosed embodiments. The housing 505 can be formed by any desired sectional shapes. A central region of an inner side of the housing 505 is substantially connected to the shaft 56, and at least one through hole 500 is formed on a bottom of the housing 505. In this embodiment, the bottom of the housing 505 comprises a plurality of through holes 500. The through holes 500 are formed between any two adjacent connecting members 502. The cover 501 is connected to an exterior of the bottom of the housing 505, and a distance "d" is formed between the cover 501 and the housing 505. In the embodiment, the cover 501 is connected to the exterior of the bottom of the housing 505 via a plurality of connecting members 502 arranged radially and outwardly and with respect to the axis a1-a1 of the shaft 56. Another embodiments, the shaft 56 is connected to the cover 501 directly (not shown), and the cover 501 is connected to the housing 505 via a plurality of connecting members 502. The connecting members 502 can be a flat plate (FIG. 3D), a bar, or an arc plate (not shown in Figs.). The size of the cover 501 is designed to be large enough to overlap all through holes 500 formed on the bottom of the housing 505.

As the centrifugal fan motor 5 is actuated, the impeller 51 rotated by the rotator 50 produces an airflow pressure difference, and airflow moves in a direction 60 in FIG. 3C'. The flow rate of airflow at the exterior of the housing 505 is larger than the flow rate of airflow inside of the housing 505. It is understood that airflow inside of the housing 505 is expelled to the exterior of the housing 505 from the through hole 500 via the distance "d" based on the Bernoulli's Principle. Also, a heat generated in the housing 505 is expelled to the exterior in the same way in a direction 61 of FIGS. 3B and 3C'.

Thus, with the connecting members 502 arranged outwardly and radially connect the cover 501 to the exterior of the bottom of the housing 505, airflow inside of the housing 505 is effectively and efficiently expelled to the exterior by the rotating connecting members 502, increasing heat-dissipation efficiency. Alternatively, when the cover 501 overlaps all through holes 500 on the bottom of the housing 505, objects such as dust or particles are completely stopped from entering the housing 505 via the through holes 500, so that the shaft 56 is prevented from being obstructed and thus its average life thereof increases.

Figure 3D:
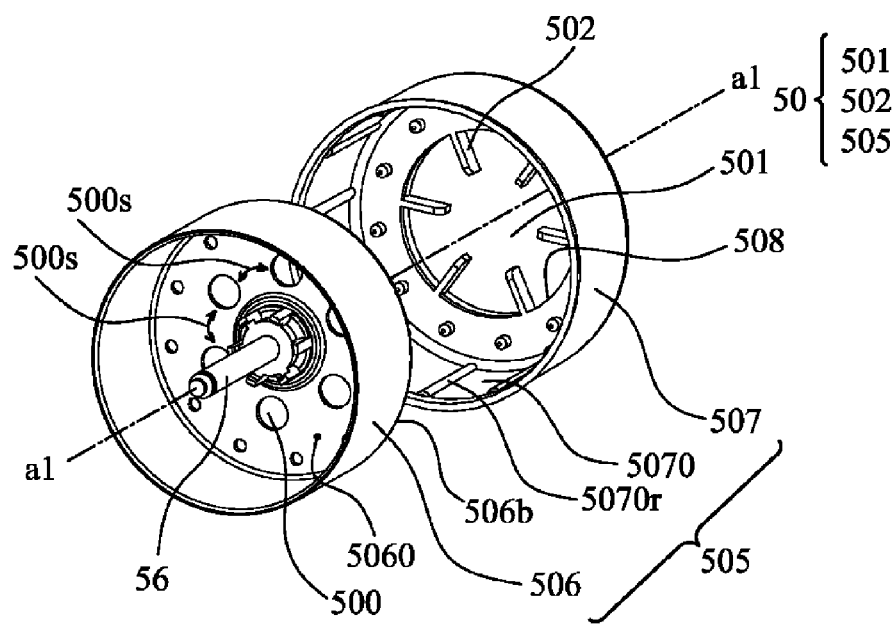
FIG. 3D is an exploded view of a housing of the centrifugal fan motor of the invention.

In FIG. 3D, the housing 505 comprises a shell 506 and a hub 507 outwardly connected to the shell 506. The through holes 500 are formed on the bottom of the shell 506, and the adjacent through holes 500 are divided by a spacing region 500s therebetween. The hub 507 connected with and accommodating the shell 506 has a rounded opening 508 with an inner circumference, and the cover 501 covers the opening 508 of the hub 507 and is positioned apart from the hub 507 by the distance d, so that the cover 501 prevents an object from entering the plurality of through holes 500 of the shell 506. The plurality of connecting members 502 are uniformly arranged and utilized for connecting the cover 501 to the hub 507. That is, the connecting members 502 are radially extended through and from the inner circumference of the opening 508 of the hub 507. In this embodiment, the hub 507, the cover 501 and the plurality of connecting members 502 are formed as a single piece. When the hub 507 and the shell 506 are connected, the plurality of through holes 500 of the shell 506 are respectively located between any two adjacent connecting members 502. That is, when the hub 507 and the shell 506 are connected, the connecting members 502 are respectively disposed at the spacing regions 500s and do not block the through holes 500 of the shell 506. The inner side 5060 of the shell 506 of the housing 505 is connected to the shaft 56 rotating about an axis a1-a1, and the through holes 500 are circumferentially formed on a bottom 506t of the shell 506 of the housing 505 with respect to the axis a1-a1, and the hub 507 of the housing 505 is connected to the cover 501 via the connecting members 502. The connecting members 502 are connected to an edge of the cover 501 to form a distance is formed between the cover 501 and the hub 507 of the housing 505, so that the assembled shell 506 and hub 507 of the housing 505 still has the same effect as the housing 505. One through hole 500 of the plurality of through holes 500 is relatively located between any two adjacent connecting members 502 of the plurality of connecting members 502 when the shell 506 and the hub 507 are assembled. Note that the hub 507 comprises an inner wall 5070 and a plurality of spaced ribs 5070r longitudinally formed on the inner wall 5070, and the spaced ribs 5070r of the hub 507 are outwardly contacted with the shell 506 when the shell 506 and the hub 507 are assembled.

The connecting members 502 of the embodiment of the invention are protruded from the inner circumference of the opening 508 of the hub 507, the side surfaces of the connecting members 502 are connected to the hub 507, the top ends of the connecting members 502 are connected to the cover 501, and the bottom ends of the connecting members 502 are close to the shell 506 inside the hub 507. Thus, the connecting members 502 of the embodiment of the invention have increased structure strength, are properly protected, and are hardly broken or damaged.

The connecting members 502 of the embodiment of the invention are protruded from the inner circumference of the opening 508 of the hub 507, and the cover 501 is disposed on the connecting members 502. The dimension of the cover 501 can be reduced to axially covering the through holes.

Additionally, with reference to FIGS. 3C and 3C' airflow can pass through the through holes inside the hub 507 to be guided outward by the connecting members 502. The flow rate of the airflow passing the hub 507 can be increased.

It is noted that all features of the invention can be applied in an axial-flow fan structure not shown and any kind of motor, especially for an axial-flow fan structure equipped with a frame not shown.

While the invention has been described with respect to preferred embodiment, it is to be understood that the invention is not limited thereto the disclosed embodiments, but, on the contrary, is intended to accommodate various modifications and equivalent arrangements included within the spirit and scope of the appended claims.

What is claimed is:

1. A heat-dissipation structure for a motor, comprising:
   a shaft;
   a seat; and
   a rotator coupled to the seat by the shaft, comprising:
   a shell connected to the shaft and comprising a top surface having a plurality of through holes;
   a hub connected with and accommodating the shell, the hub comprising an opening having a circumference, wherein the opening of the hub exposes the plurality of through holes of the shell;
   a cover covering the opening of the hub and positioned apart from the hub by a distance, the top surface of the shell being enclosed within a combination of the hub and the cover so as to prevent an object from entering the plurality of through holes of the shell; and
   a plurality of connecting members utilized for connecting the cover to the hub, wherein the plurality of connecting members connect to the hub at the circumference of the opening and extend radially inward from said circumference along a bottom side of the cover, the plurality of through holes of the shell are respectively located between any two adjacent connecting members and are not blocked by the connecting members such that airflow passes through the through holes of the shell and is guided, between the cover and the hub, radially outward by the connecting members; wherein the hub, the cover, and the plurality of connecting members are formed as a single piece, and wherein the plurality of connecting members are located within the circumference of the opening and directly between said opening and the cover.

2. The heat-dissipation structure for the motor as claimed in claim 1, wherein heat generated in the rotator is expelled to an exterior of the hub from the plurality of through holes as the rotator is rotated.

3. The heat-dissipation structure for the motor as claimed in claim 1, wherein the plurality of connecting members comprise a flat plate, a bar, or an arc plate.

4. The heat-dissipation structure for the motor as claimed in claim 1 further comprising an impeller surrounding the rotator, so that the impeller is rotated with the rotator.

5. The heat-dissipation structure for the motor as claimed in claim 1 further comprising an impeller connecting to the rotator, so that the impeller is rotated with the rotator.

6. The heat-dissipation structure for the motor as claimed in claim 5, wherein the impeller comprises a centrifugal impeller.

7. The heat-dissipation structure for the motor as claimed in claim 5, wherein the impeller comprises an axial-flow impeller.

8. The heat-dissipation structure for the motor as claimed in claim 7, wherein the heat-dissipation structure further comprises a frame enclosing the impeller.

9. The heat-dissipation structure for the motor as claimed in claim 1, wherein the hub is substantially cylindrical.

10. A heat-dissipation structure for a motor, comprising:
a shaft;
a seat; and
a rotator coupled to the seat by the shaft, comprising:
a shell comprising a top surface having a plurality of through holes;
a hub connected with and accommodating the shell, the hub comprising an opening having a circumference, wherein the opening of the hub exposes the plurality of through holes of the shell;
a cover connecting to the shaft and covering the opening of the hub, the cover being positioned apart from the hub by a distance, wherein the top surface of the shell is enclosed within a combination of the hub and the cover so as to prevent an object from entering the plurality of through holes of the shell; and
a plurality of connecting members utilized for connecting the cover to the hub, wherein the plurality of connecting members connect to the hub at the circumference of the opening and extend radially inward from said circumference along a bottom side of the cover, the plurality of through holes of the shell are respectively located between any two adjacent connecting members and are not blocked by the connecting members such that airflow passes through the through holes of the shell and is guided, between the cover and the hub, radially outward by the connecting members; wherein the hub, the cover, and the plurality of connecting members are formed as a single piece, and wherein the plurality of connecting members are located within the circumference of the opening and directly between said opening and the cover.

11. The heat-dissipation structure for the motor as claimed in claim 10, wherein heat generated in the rotator is expelled to an exterior of the hub from the plurality of through holes as the rotator is rotated.

12. The heat-dissipation structure for the motor as claimed in claim 10, wherein the plurality of connecting members comprise a flat plate, a bar, or an arc plate.

13. The heat-dissipation structure for the motor as claimed in claim 10, wherein the hub comprises an inner wall and a plurality of spaced ribs longitudinally and circumferentially formed on the inner wall, and the spaced ribs of the hub are outwardly contacted with the shell when the shell and the hub are assembled.

14. A heat-dissipation structure for a motor, comprising:
a seat; and
a rotator rotatably coupled to the seat, comprising:
a shell rotatably coupled to the seat, the shell comprising a top surface having a plurality of through holes;
a hub comprising an opening having
a circumference, wherein the opening of the hub exposes the plurality of through holes of the shell;
a plurality of connecting members;
a cover positioned apart from the opening of the hub by the plurality of connecting members and the top surface of the shell being enclosed within a combination of the hub and the cover, wherein the plurality of connecting members connect to the hub at the circumference of the opening and extend radially inward from said circumference along a bottom side of the cover, the plurality of through holes of the shell are respectively located between any two adjacent connecting members and are not blocked by the connecting members such that airflow passes through the through holes of the shell and is guided, between the cover and the hub, radially outward by the connecting members; wherein the hub, the cover, and the plurality of connecting members are formed as a single piece, and wherein the plurality of connecting members are located within the circumference of the opening and directly between said opening and the cover.

* * * * *